US008910542B2

(12) United States Patent
Klimecki

(10) Patent No.: US 8,910,542 B2
(45) Date of Patent: Dec. 16, 2014

(54) PANEL FOR A DOMESTIC APPLIANCE HAVING A ROTARY SWITCH, AND DOMESTIC APPLIANCE

(75) Inventor: Marek Klimecki, Poznan (PL)

(73) Assignee: PAS Deutschland GmbH, Neuruppin (DE)

( * ) Notice: Subject to any disclaimer, the term of this patent is extended or adjusted under 35 U.S.C. 154(b) by 0 days.

(21) Appl. No.: 13/598,054

(22) Filed: Aug. 29, 2012

(65) Prior Publication Data
US 2013/0228038 A1 Sep. 5, 2013

Related U.S. Application Data

(63) Continuation of application No. PCT/EP2011/053123, filed on Mar. 2, 2011.

(30) Foreign Application Priority Data

Mar. 2, 2010 (DE) .......................... 10 2010 009 993

(51) Int. Cl.
| | | |
|---|---|---|
| *G05G 1/10* | (2006.01) | |
| *H01H 9/00* | (2006.01) | |
| *H01H 13/62* | (2006.01) | |
| *G05G 5/03* | (2008.04) | |
| *H01H 19/02* | (2006.01) | |
| *H01H 19/14* | (2006.01) | |
| *B60K 37/06* | (2006.01) | |

(52) U.S. Cl.
CPC ................. *G05G 1/105* (2013.01); *G05G 5/03* (2013.01); *H01H 19/025* (2013.01); *H01H 19/14* (2013.01); *B60K 37/06* (2013.01); *G05G 1/10* (2013.01); *B60K 2350/102* (2013.01)
USPC .............................. 74/553; 200/316; 200/565

(58) Field of Classification Search
USPC ........ 74/10 A, 10 R, 10.1, 10.2, 10.22, 10.41, 74/473.3, 553, 527; 292/336.3, 347, 348; 16/414, 417, 433, 441; 70/192; 200/316, 564, 565; 40/331; 334/88; 362/23.09, 23.13, 23.16, 23.2, 23.22
IPC ......................................................... G05G 1/10
See application file for complete search history.

(56) References Cited

U.S. PATENT DOCUMENTS 2,742,015 A * 4/1956 Hoyle ............................ 116/310
4,487,089 A * 12/1984 Harwood ........................ 74/531

(Continued)

FOREIGN PATENT DOCUMENTS

| DE | 2245444 B2 | 4/1979 |
|---|---|---|
| DE | 10234925 A1 | 2/2004 |

(Continued)

OTHER PUBLICATIONS

European Patent Organization, PCT International Search Report (PCT/ISA/220), for PCT/EP2011/053123 (priorty document for the present application), 10 pages (German).

*Primary Examiner* — Thomas R. Hannon
*Assistant Examiner* — Adam D Rogers
(74) *Attorney, Agent, or Firm* — Kevin E. Flynn; Flynn IP Law

(57) ABSTRACT

A panel for a domestic appliance having a rotary switch, the rotary switch having a rotary element, a latching ring, at least one latching element and a rotation axis about which the rotary element rotates relative to the latching ring, wherein the latching ring has at least one latching lug on its inner face, said latching lug projecting radially toward the center the latching ring, wherein the latching element is held on the rotary element and is prestressed radially outward against the inner face of the latching ring, wherein the rotary element and the latching ring are arranged along the rotation axis, and wherein the latching ring is arranged in a rotationally fixed manner on the panel. A corresponding domestic appliance having a panel is also disclosed.

20 Claims, 5 Drawing Sheets

(56) References Cited

U.S. PATENT DOCUMENTS

| | | | |
|---|---|---|---|
| 5,204,502 A | 4/1993 | Ferris | |
| 5,359,165 A * | 10/1994 | Leveque et al. | 200/317 |
| 5,606,155 A * | 2/1997 | Garcia | 200/11 R |
| 5,801,346 A * | 9/1998 | Taniuchi | 200/11 K |
| 7,211,755 B1 * | 5/2007 | Wang et al | 200/336 |
| 7,255,061 B2 * | 8/2007 | Denton | 116/310 |
| 7,439,835 B2 | 10/2008 | Dietrich | |
| 7,462,795 B2 * | 12/2008 | Montalvo | 200/336 |
| 7,550,686 B2 | 6/2009 | Girke | |
| 8,552,325 B2 * | 10/2013 | Fukushima et al. | 200/565 |
| 8,686,306 B2 * | 4/2014 | Harris et al. | 200/336 |

FOREIGN PATENT DOCUMENTS

| | | |
|---|---|---|
| DE | 20314364 U1 | 4/2004 |
| GB | 1400116 | 7/1975 |

* cited by examiner

PANEL FOR A DOMESTIC APPLIANCE HAVING A ROTARY SWITCH, AND DOMESTIC APPLIANCE

CROSS REFERENCES TO RELATED APPLICATIONS

This application is a continuation of international patent application PCT/EP2011/053123, filed on Mar. 2, 2011 designating the U.S., which international patent application has been published in German language and claims priority from German patent application DE 10 2010 009 993.7, filed on Mar. 2, 2010. The entire contents of these priority applications are incorporated herein by reference.

BACKGROUND

The present disclosure relates to a panel for a domestic appliance having a rotary switch.

The disclosure also relates to a domestic appliance having a rotary switch and/or having a panel.

Domestic appliances, including washing machines and dryers in particular, are generally operated using operator control elements which are arranged on the front face of the domestic appliance. The operator control elements are usually integrated in a panel in this case.

Typical operator control elements include so-called rotary switches. In this case, a user can turn the rotary switch into various rotary positions and in this way make specific settings on the domestic appliance. For example, a specific washing temperature, a specific program or a desired degree of drying can be predefined by the rotary switch in this way.

Rotary switches according to the prior art, as shown in DE 22 45 444 for example, are of relatively complex construction and can be matched to specific requirements only with a considerable amount of expenditure. In addition, the required components are relatively expensive and have, overall, a relatively large total height or total depth.

It is customary for specific latching positions to be predefined the case of rotary switches. This has the effect of, firstly, the user experiencing haptic feedback with respect to the latching positions when turning the rotary switch. Secondly, it may be desired for the rotary switch to come to rest only at the predefined latching positions, that is to say, if the rotary switch is released in a position which does not correspond to any of the predefined latching positions, the rotary switch automatically moves into the next latching position.

SUMMARY OF THE DISCLOSURE

Therefore, one object of the present disclosure is to disclose a panel with an improved rotary switch which is preferably produced at low cost, can be matched to specific requirements in a simple manner and allows for a low total depth. A further object of the present disclosure is to disclose a corresponding improved domestic appliance having a rotary switch and/or having a panel.

According to a first aspect of the disclosure, the object is achieved by a panel for a domestic appliance having a rotary switch, the rotary switch having a rotary element, a latching ring, at least one latching element and a rotation axis about which the rotary element rotates relative to the latching ring, wherein the latching ring has at least one latching lug on its inner face, said latching lug projecting radially in relation to the center of the latching ring, wherein the latching element is held on the rotary element and is prestressed radially outward against the inner face of the latching ring, wherein the rotary element and the latching ring are arranged along the rotation axis, and wherein the latching ring is arranged in a rotationally fixed manner on the panel.

One notable feature of the disclosure is that the panel of the domestic appliance is used for realizing the function of the rotary switch with its latching positions. A further special feature of the disclosure is that a latching ring is used for realizing the latching positions, wherein said latching ring may be integrally formed with the panel but is advantageously designed as an element which is separate from the panel and from the rotary element.

The concept of arranging the latching ring on the panel simplifies the design of the rotary switch and allows the rotary switch to be manufactured in a very simple manner in respect of the number and the angle values of the latching positions. All other components can be retained in order to achieve this since only the latching ring is adapted.

The rotary switch is advantageously connected in a rotationally fixed manner to an angular position measuring device which can distinguish between at least two angular positions. One possible angular position measuring device is, for example, a potentiometer which indicates various angular positions by varying resistance values.

A further advantage is that the rotary switch can be realized in a particularly expedient manner in interaction with the panel since, in particular, the housing can be omitted in comparison to the known rotary switches. Instead, only the panel itself serves to accommodate the rotary element and the latching ring.

A further advantage of the rotary switch or of the panel is that a particularly low total depth can be achieved. As a result, the panel can be of particularly compact construction. In addition, it is advantageous, as will be explained in greater detail below, for all parts to be able to be produced from plastic. This leads to a further reduction in the costs of production.

An additional advantage is that the rotary switch and rotary knob can be produced from different materials. The haptic feedback of the rotary selector system in conjunction with the panel can be specifically influenced by combining different materials such as plastic/metal.

Even though the teachings of the present disclosure can be realized with one latching element, it is advantageous when the rotary switch has two latching elements which, in particular, are situated diametrically opposite one another in relation to the rotation axis. Three or more latching elements can also be used in principle.

It should be noted, very generally, that the terms "at the top", "at the bottom", "above", "below", "upper face", "lower face", "upper part", "lower part", etc. are merely orientation aids within the scope of this disclosure. Therefore, an element which is located "at the top" should be further away from the interior of the domestic appliance, that is to say located closer to the user, than an element which is located "at the bottom" and is accordingly located closer to the interior of the domestic appliance, that is to say further away from the user.

In one advantageous refinement of the teachings of the disclosure, the rotary element has a first shaped part and a second shaped part which are arranged along the rotation axis, wherein the latching element is arranged in a moveable manner in particular on the first shaped part and/or on the second shaped part.

This refinement provides a particularly compact design. The latching element or the latching elements can preferably be moved radially in relation to the rotation axis in this case.

In a further advantageous refinement of the teachings of the disclosure, the first and the second shaped part are separate from one another and are connected, in particular connected in an interlocking manner, to one another for joint rotary movement about the rotation axis.

This refinement is advantageous particularly in respect of the production process. Therefore, the second shaped part is initially advantageously inserted into the panel, followed by the latching ring and finally the first shaped part. If the second shaped part is attached to the panel and the first shaped part is connected, in particular locked, to the second shaped part, the result is reliable fixing of the first shaped part, second shaped part and latching ring, yet still allowing rotary movement of the shaped parts in relation to the latching ring.

In a further advantageous refinement of the teachings of the disclosure, the first shaped part and/or the second shaped part have a portion which has an outside diameter which is larger than a free inside diameter of the latching ring.

This results, in a particularly simple manner, in that the rotary element, i.e., the first shaped part and the second shaped part, is limited or even fixed in relation to the latching ring in respect of an axial movement along the rotation axis.

In a further advantageous refinement of the teachings of the disclosure, at least one part of a light guide is arranged along the rotation axis.

This refinement makes it easy to route light from a lower face of the rotary switch in the direction of the upper face of the rotary switch. Since the light guide or at least one part of the light guide is arranged along the rotation axis, light can always be guided in the same way, irrespective of the rotary position of the rotary switch. This refinement is possible, in particular, because the rotary switch according to the teachings of the disclosure does not require a central mechanical rotation axis.

In a further advantageous refinement of the teachings of the disclosure on, the light guide has a portion which is designed to guide light which is routed along the rotation axis radially away from the rotation axis.

As a result, lighting outside the rotation axis can be achieved in a simple manner. In this case, the light is advantageously deflected at one or more oblique surfaces. In this case, it is particularly advantageous when the light guide has two surfaces which are approximately parallel and at which the light is deflected twice through approximately 90° in each case in order to guide the light in a direction which is approximately parallel to the rotation axis but at a distance from the rotation axis.

In a further advantageous refinement of the teachings of the disclosure, the latching element has a latching head and a spring element, wherein the spring element prestresses the latching head toward the outside and the spring element is supported, in particular, on the first and/or on the second shaped part.

This refinement allows for a particularly simple and compact construction. Various advantageous embodiments are possible. These include, firstly, that the latching head is a plastic element with a rounded portion, wherein the rounded portion comes into contact with the latching ring. This spring element is designed as a helical spring, in particular one composed of metal, in this case. Secondly, it is advantageous when the latching head and the spring element are integrally formed as a plastic part, wherein the spring element has at least one, preferably two, and particularly preferably more than two, spring arms. The latching positions can be particularly well-defined by the prestress.

In a further advantageous refinement of the teachings of the disclosure, a rotary knob is arranged on the rotary element, in particular on the first shaped part.

The rotary element, in particular the first shaped part, can, in principle, already have a rotary knob which the user grips for operating the rotary switch. However, it is particularly advantageous when the rotary element, in particular the first shaped part, is separate from the rotary knob. In this case, the rotary element can be produced from a particularly low-cost plastic and, in particular, with a cost-effective production method, in particular injection-molding, whereas the rotary knob which the user takes hold of and which is visible to said user is preferably composed of a particularly high-grade plastic or of metal. Therefore, because the rotary element and rotary knob are separate, the production costs can be kept comparatively low in spite of the high-quality appearance.

In a further advantageous refinement of the teachings of the disclosure, the latching ring has at least one shaped portion and the panel has a mating shaped portion, wherein the shaped portion and the mating shaped portion engage one in the other in an interlocking manner in order to position the latching ring relative to the panel.

This refinement allows for the latching ring to be arranged securely and in a manner which is expedient in terms of production. In particular, the shaped portion is in the form of a recess and the mating shaped portion is in the form of a projection, or the shaped portion is in the form of a projection and the mating shaped portion is in the form of a recess. This refinement may additionally allow to ensure, in a simple manner, that the position of the latching ring relative to the panel does not change when the rotary element is turned.

In a further advantageous refinement of the teachings of the disclosure, the panel has a recess into which the latching ring is inserted, wherein the recess is designed, in particular, in such a way that the latching ring is arranged in a plane below the plane spanned by the surface of the panel.

This refinement simplifies the production process since the latching ring is particularly easy to insert and fix relative to the panel. The proposed refinement also allows that the rotary switch requires just a low total height in relation to the surface of the panel. In particular, the result may be that the total height of the rotary switch above the surface of the panel corresponds approximately to the total height of the grip part of the rotary knob.

In a further advantageous refinement of the teachings of the disclosure, the panel has a recess into which the second shaped part is inserted, wherein the second shaped part is locked, in particular, in the recess.

This refinement simplifies the production process of the panel since the rotary switch can be realized simply by simply inserting the components in the panel. In addition, the total height of the rotary switch above the surface of the panel is kept low. Locking is advantageous since no further attachment measures are required after insertion.

In a further advantageous refinement of the teachings of the disclosure, a printed circuit board with a light source is arranged beneath the panel, wherein the light source is arranged along the rotation axis of the rotary switch.

This refinement allows that the rotary switch may be lighted in a particularly simple manner, in particular at the surface of the rotary knob. Since the rotary switch according to the teachings of the disclosure does not require a central mechanical rotation axis, the switch can be arranged with its rotation axis above a light source from where the light, at least for a specific portion, is guided along the rotation axis of the rotary switch. As a result, the rotary switch can be lighted in a simple manner irrespective of the angular position of the rotary switch.

In a further advantageous refinement of the teachings of the disclosure, the rotary knob is produced from a first material and the rotary element and the latching ring are produced from a different, second material, wherein the first material is, in particular, a high-grade plastic or a metal.

This refinement allows for particularly high-quality haptic feedback at relatively low production costs.

According to a second aspect of the teachings of the disclosure, the object is achieved by a domestic appliance having an above-described panel.

BRIEF DESCRIPTION OF THE DRAWINGS

It goes without saying that the features mentioned above and those still to be explained below can be used not only in the respectively indicated combinations but also in other combinations or on their own, without departing from the scope of the present disclosure.

Exemplary embodiments of the disclosure will be explained in greater detail in the following description and are illustrated in the drawing, in which.

DESCRIPTION OF PREFERRED EMBODIMENTS

Figure 1:
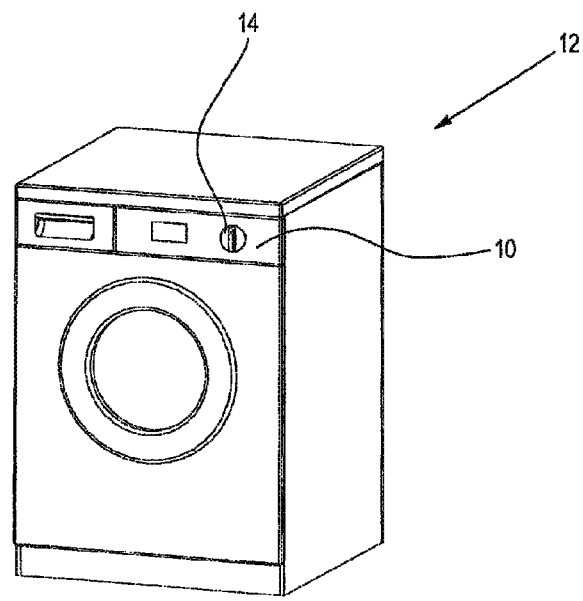
FIG. 1 shows a domestic appliance having a panel and a rotary switch.

FIG. 1 shows a panel 10 on a domestic appliance 12, in this case a washing machine. A rotary switch 14 is arranged on the panel 10 and will be explained in greater below.

Figure 2:
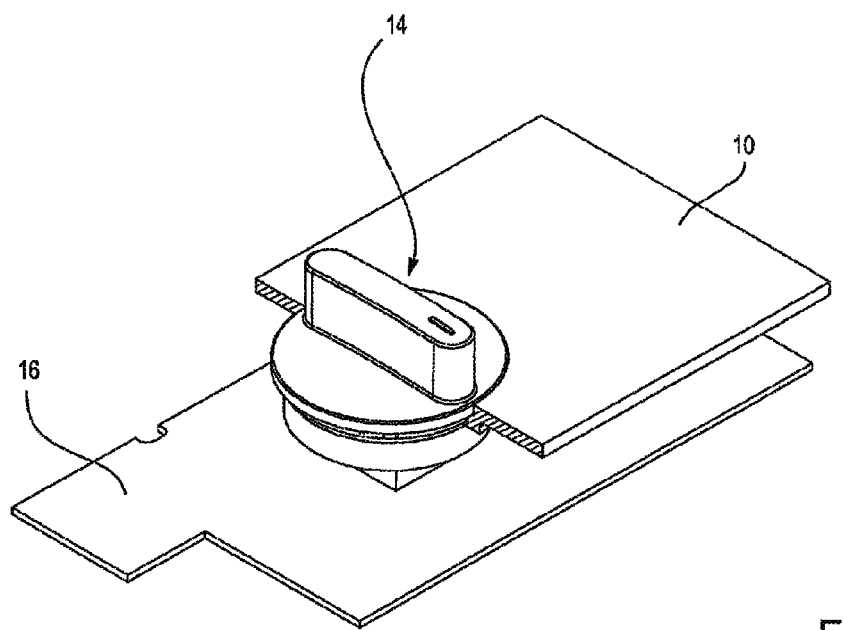
FIG. 2 shows a rotary switch in a sectioned panel.

FIG. 2 shows an illustration of a detail of the panel 10 according to FIG. 1, wherein the panel 10 is illustrated in a sectioned manner in this case. In order to clarify the installation situation, a printed circuit board 16 is arranged beneath the panel 10 and the electronics for the function of the rotary switch 14 are located on said printed circuit board. The individual constituent parts of the rotary switch 14 will be explained in greater detail below.

Figure 3:
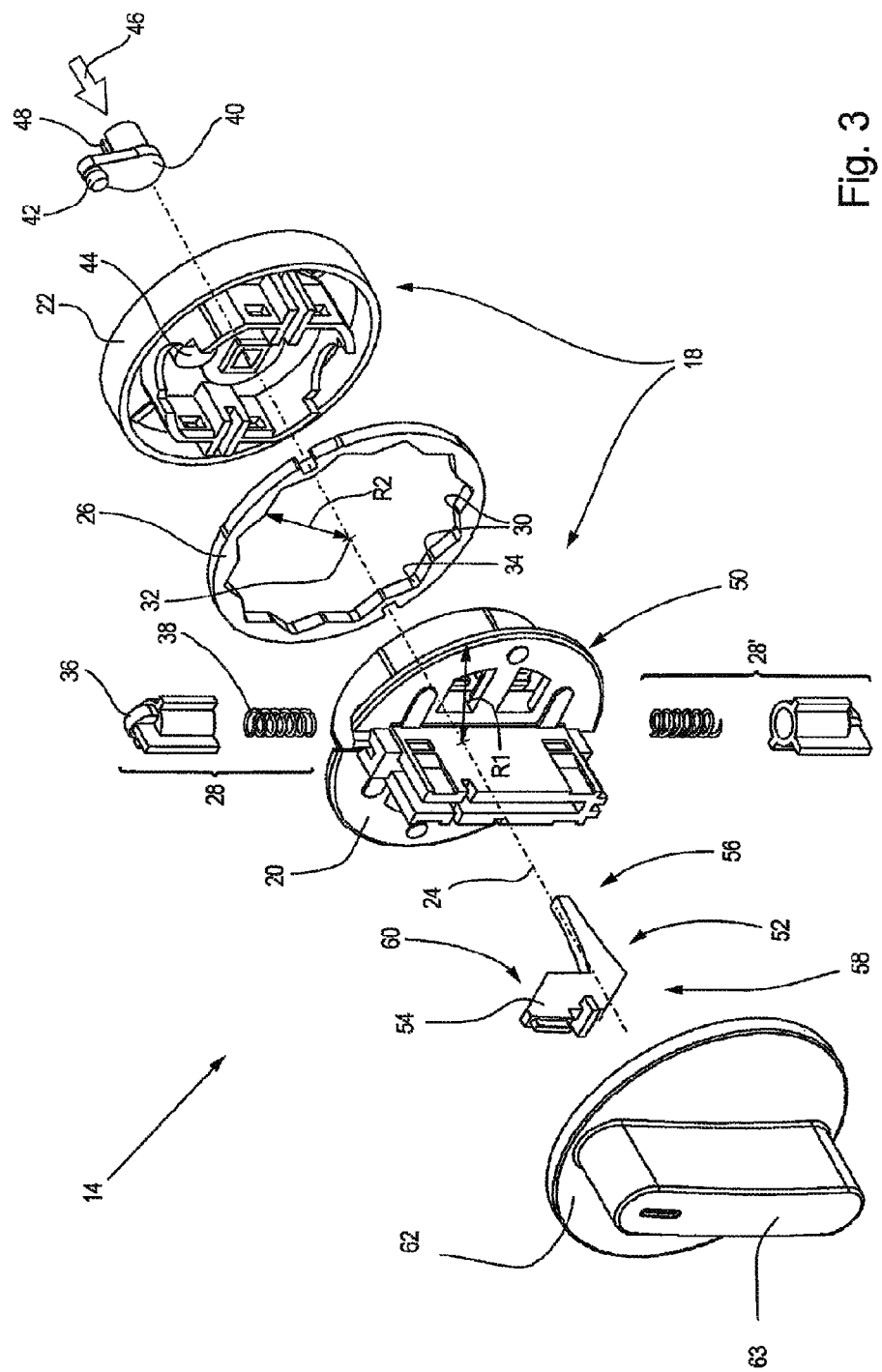
FIG. 3 shows an exploded view of the rotary switch according to FIG. 2.

FIG. 3 shows a first embodiment of a rotary switch 14, as it is inserted into the panel 10 according to FIG. 1. The rotary switch 14 has a rotary element 18 which has a first shaped part 20 and a second shaped part 22 in this case. The rotary element 18, and therefore also the first shaped part 20 and the second shaped part 22, are arranged along a rotation axis 24.

The rotary switch 14 also has a latching ring 26 which is likewise arranged along the rotary axis 24. The rotary switch 14 also has at least one latching element 28, in this case two latching elements 28, 28'. Whereas the rotary element 18 can rotate about the rotation axis 24, the latching ring 26 is seated in a rotationally fixed manner in relation to the rotation axis 24, that is to say it does not execute a rotary movement about the rotation axis 24, in the installed state. This means that the rotary element 18 rotates relative to the latching ring 26.

The latching ring 26 has at least one latching lug 30, in particular a large number of latching lugs 30, in this case twelve latching lugs 30, on its inner face. The latching lugs 30 project radially toward the center 32 of the latching ring 26. The latching element 28, 28' is held on the rotary element 18 and is prestressed radially outward against the inner face 34 of the latching ring 26. For this purpose, the latching element 28, 28' has a latching head 36 and a spring element 38, wherein the spring element 38 prestresses the latching head 36 toward the outside, and wherein the spring element 38 is supported on the rotary element 18, in this case in particular on the first shaped part 20. Therefore, the latching element 28, 28' is arranged in a radially moveable manner on the rotary element 18.

It can be seen that the first and the second shaped part 20, 22 are separate from one another and can be connected, in particular connected in an interlocking manner, to one another for joint rotary movement about the rotation axis 24. This means that a rotation of the first shaped part 20 which is initiated by the user leads to a corresponding rotation of the second shaped part 22.

The second shaped part 22 has an associated lever 40 which engages in a recess 44 in the second shaped part 22 by way of a cam 42. In the event of a rotary movement of the rotary element 18, this leads to the lever 40 rotating about the rotation axis 24 with the rotary element 18 approximately in the same way.

The lever 40 is hollow and/or produced from a transparent material along the rotation axis 24, so that light 46 which is incident along the rotation axis 24 can propagate through the lever 40. The lever 40 additionally has a recess 48 which can interact in an interlocking manner with an angular position measuring device.

In this case, the first shaped part 20 has a portion 50 which has an outside radius R1 which is larger than a free inside radius R2 of the latching ring 26. This ensures, in a simple manner, that the latching ring 26 is held in a predefined position by the first shaped part 20 in the installed state.

At least one part 52 of the light guide 54 is arranged along the rotation axis 24. The light guide 54 passes on light 46 which is shone in at the base end 56 of said light guide. In the embodiment shown here, the light 46 enters the light guide 54 after it has passed through the lever 40. As will be explained in greater detail later, the light guide 54 has a portion 58 which is designed to guide light 46 which is routed along the rotation axis 24 radially away from the rotation axis 24. In the embodiment shown here, the light guide 54 also has a second section 60 which deflects the light once again and passes on said light approximately parallel to the rotation axis 24 but at a distance from the rotation axis 24.

Finally, a rotary knob 62 is shown which is arranged on the rotary element 18, in this case on the first shaped part 20.

Figure 4:
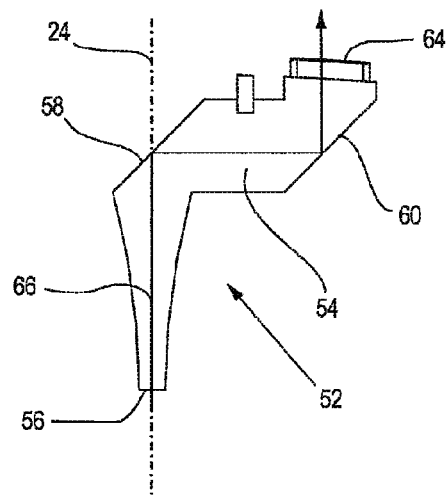
FIG. 4 shows a plan view of the light guide according to FIG. 3.

FIG. 4 shows a side view of the light guide 54. The beam path of a light beam 66 which is routed along the rotation axis 24 in the light guide 54 is shown by way of example here. The light beam 66 enters at the base end 56 of the light guide 54. The light beam 66 is then guided radially away from the rotation axis 24, in particular approximately perpendicular to the rotation axis 24, caused by an inner reflection at the first portion 58. The light beam 66 is then once again redirected by an inner reflection at a second portion 60, specifically at least approximately parallel to the rotation axis 24. The light beam 66 then leaves the light guide 54 through the head region 64 of the light guide 54.

Figure 5:
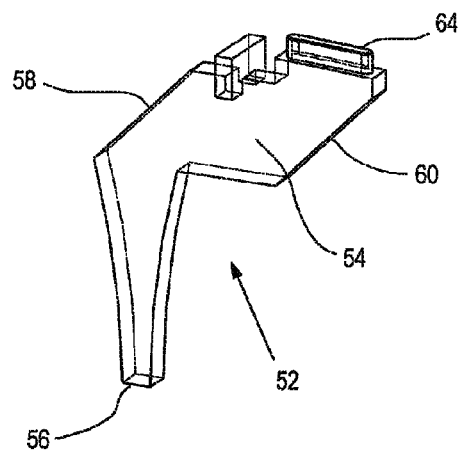
FIG. 5 shows a perspective view of the light guide according to FIG. 4.

FIG. 5 shows a three-dimensional illustration of the light guide 54. The transparency of the light guide 54 is indicated in that the lines which are actually covered are thin.

Figure 6:
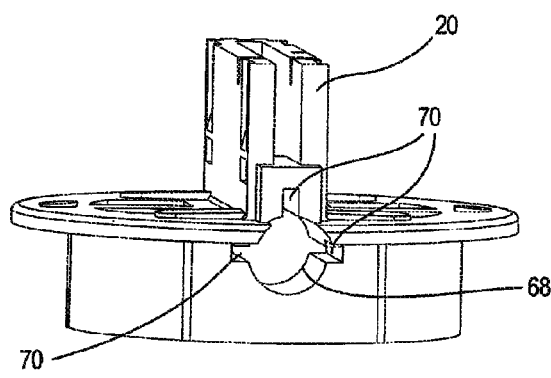
FIG. 6 shows a further view of the first shaped part according to FIG. 3.

FIG. 6 shows another view of the first shaped part 20. A recess 68 with three guide grooves 70 is shown in this case. The latching head 36 engages in an interlocking manner in said guide grooves 70 and is thereby securely routed. In this case, the spring elements 38 are supported either against one another or against the first shaped part 20 itself.

Figure 7:
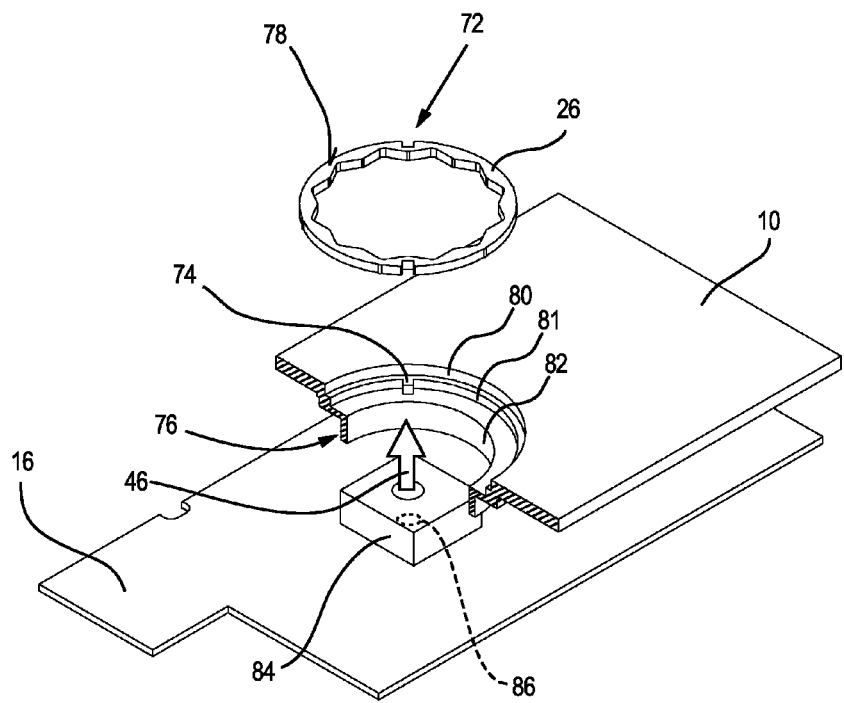
FIG. 7 shows a sectioned panel above a printed circuit board with a latching ring at a distance.

FIG. 7 shows a similar view to that in FIG. 2, wherein, however, the rotary switch 14 is now not illustrated and the latching ring 26 is illustrated in a floating manner above the panel 10 for illustrating the following explanations. It can be seen that the latching ring 26 has at least one shaped portion 72, in this case a recess, and the panel 10 has a mating shaped portion 74, in this case a projection. The shaped portion 72 and the mating shaped portion 74 engage one in the other in an interlocking manner in order to position the latching ring 26 relative to the panel 10. The latching ring 26 is then arranged in a rotationally fixed manner, so that it cannot rotate about the rotation axis 24.

Even though the mating shaped portion 74 can be arranged on the surface of the panel 10, it is advantageous when the panel 10 has a recess 76 into which the latching ring 26 is inserted. In this case, the recess 76 can be designed such that the upper face of the inserted latching ring 26 terminates with the surface of the panel 10. However, it is considered to be particularly advantageous when the recess 76 is designed in such a way that the latching ring 26, in particular the upper face 78 of the latching ring 26, is arranged in a plane beneath the plane spanned by the surface of the panel 10. As a result, the rotary switch 14 can, overall, be inserted into the panel 10 to a depth such that only the grip part 63 of the rotary knob 62 projects beyond the plane spanned by the surface of the panel 10.

Furthermore, FIG. 7 shows the angular position measuring device 84 on the printed circuit board 16, said angular position measuring device 84 detecting the angular position of the lever 40. Furthermore, a light source 86 which emits the light 46 shown in FIG. 3 out of the center of the angular position measuring device 84 is illustrated by a dashed line. In this case, the recess 76 has, starting from the surface of the panel 10, a first recess 80 with a large diameter, beneath this a second recess 81 with a medium diameter, and beneath this a third recess 82 with a small diameter, wherein the large diameter is larger than the medium diameter, and the medium diameter is larger than the small diameter. Thus, FIG. 7 shows a distal opening corresponding to the third recess 82 and a larger proximal opening corresponding to second recess 81 to define recess 76 which receives the latching ring 26. Distal and proximal are defined relative to a user of the rotary switch. Note that mating shaped portion 74 extends into the recess 76 between third recess 82 and second recess 81. Mating shaped portion 74 extends into recess 76 for engagement with the latching ring 26 to preclude rotation of the latching ring 26.

The large diameter corresponds approximately to the greatest radial extent R1 of the first shaped part 20 in its portion 50, the medium diameter corresponds to the outside diameter of the latching ring 26, and the small diameter corresponds to the outside diameter of the second shaped part 22. In this case, it is advantageous when the second shaped part 22 is locked in the recess 76.

Figure 8:
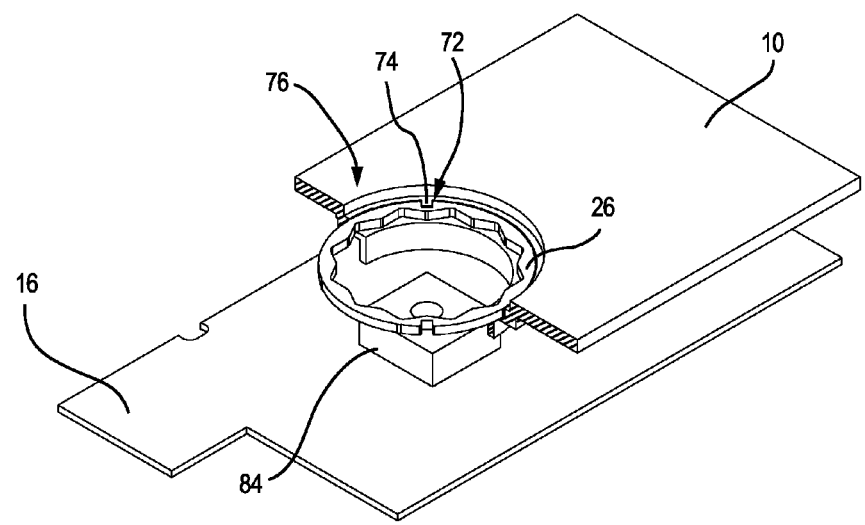
FIG. 8 shows a sectioned panel above a printed circuit board with a latching ring inserted.

Finally, FIG. 8 shows a situation which corresponds to that in FIG. 7, but wherein the latching ring 26 is now inserted in the recess 76 and is connected in an interlocking manner to the mating shaped element 74.

Figure 9:
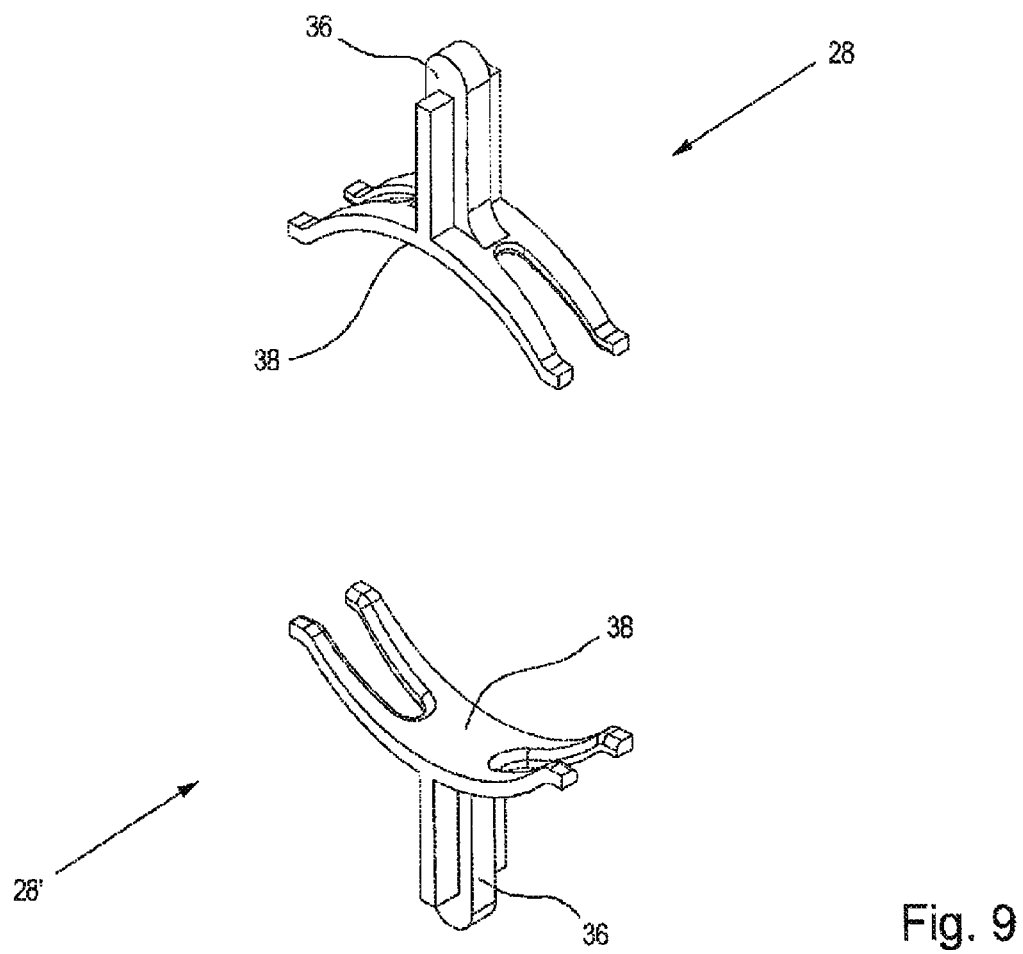
FIG. 9 shows a second embodiment of the latching element of a rotary switch.

FIG. 9 shows an alternative embodiment of a latching element 28, 28' according to a second embodiment of a rotary switch 14. The latching head 36 here is designed in a similar manner to as has been explained with reference to FIG. 3. In order to prestress the latching head 36 radially outward, the spring element 38 is designed as a pair of spring bows in this case. The latching element 28, 28' is integrally formed with its latching head 36 and the spring element 38.

In should be noted, in general, that all elements of the rotary switch 14 and, in particular, also the parts of the panel 10 can be produced from plastic. This simplifies production and reduces production costs. If an embodiment according to FIG. 3 is selected, it is advantageous to produce the spring elements 38 from metal.

Overall, an improved panel with a rotary switch has been disclosed, allowing to realize a rotary switch in a cost-effective manner and to be matched to specific requirements in a simple manner in said panel.

What is claimed is:

1. A panel for a domestic appliance having a rotary switch, the rotary switch having:
    a rotary element;
    a latching ring positioned within a recess on a side of the panel of the domestic appliance that is engaged by a user during use;
    at least one latching element; and
    a rotation axis about which the rotary element rotates relative to the latching ring;
  wherein the latching ring has:
    at least one latching lug on an inner face of the latching ring;
    said latching lug projecting radially toward a center of the latching ring;
  wherein the latching element is held on the rotary element and is prestressed radially outward against the inner face of the latching ring;
  wherein the rotary element and the latching ring are arranged along the rotation axis; and
  wherein the latching ring is arranged in a rotationally fixed manner within the recess on the side of the panel through an interaction between at least one shaped portion on the latching ring and a corresponding shaped portion on the panel.

2. The panel of claim 1, wherein the rotary element has a first shaped part and a second shaped part which are arranged along the rotation axis.

3. The panel of claim 2, wherein the latching element is arranged in a moveable manner on at least one shaped part selected from the first shaped part and the second shaped part.

4. The panel of claim 2, wherein the first shaped part and the second shaped part are separate from one another and are connected to one another for joint rotary movement about the rotation axis.

5. The panel of claim 2, wherein the first shaped part and the second shaped part are separate from one another and are connected in an interlocking manner to one another for joint rotary movement about the rotation axis.

6. The panel of claim 2, wherein at least one shaped part selected from the first shaped part and the second shaped part has a portion which has an outside diameter which is larger than an inside diameter of the latching ring.

7. The panel of claim 2, wherein a spring element is supported on at least one shaped part selected from the first shaped part and the second shaped part.

8. The panel of claim 2, wherein a rotary knob is arranged on the first shaped part.

9. The panel of claim 2, wherein the second shaped part is inserted into the recess in the panel.

10. The panel of claim 9, wherein the second shaped part is locked in the recess.

11. The panel of claim 1, wherein at least one part of a light guide is arranged along the rotation axis.

12. The panel of claim 11, wherein the light guide has a portion which is designed to guide light which is routed along the rotation axis radially away from the rotation axis.

13. The panel of claim 1, wherein the latching element has a latching head and a spring element, wherein the spring element prestresses the latching head toward the latching ring.

14. The panel of claim 1, wherein a rotary knob is arranged on the rotary element.

15. The panel of claim 1, wherein the recess is designed such that the latching ring is arranged in a first plane, the first plane distal relative to a second plane spanned by a proximal surface of the panel and the first plane proximal relative to a third plane spanned by a distal surface of the panel.

16. The panel of claim 1, wherein a printed circuit board with a light source is arranged beneath the panel, wherein the light source is arranged along the rotation axis of the rotary switch.

17. The panel of claim 1, further having a rotary knob comprising a first material, and wherein the rotary element and the latching ring comprise a different, second material, wherein the first material is selected from one of a plastic and a metal.

18. A domestic appliance comprising the panel from claim 1.

19. A panel for a domestic appliance having a rotary switch, the panel having:

a tiered opening with a set of at least two openings;
 a distal opening; and
 a proximal opening larger than the distal opening, where distal and proximal are defined relative to a user of the rotary switch;
the rotary switch having:
a rotary element, having a distal portion that extends through the distal opening;
a latching ring, sized to rest on a recessed panel face having an outer perimeter defined by the proximal opening and an inner perimeter defined by the distal opening;
at least one latching element; and
a rotation axis about which the rotary element rotates relative to the latching ring;
wherein the latching ring has:
at least one latching lug on an inner face of the latching ring;
said at least one latching lug projecting radially toward a center of the latching ring;
wherein the at least one latching element is held on the rotary element and is prestressed radially outward against the inner face of the latching ring;
wherein the rotary element and the latching ring are arranged along the rotation axis; and
wherein the latching ring is arranged in a rotationally fixed manner on the recessed panel face.

20. A domestic appliance comprising the panel from claim 19.

* * * * *